United States Patent
Nehashi et al.

(10) Patent No.: US 10,962,559 B2
(45) Date of Patent: Mar. 30, 2021

(54) AUTOMATED ANALYSIS SYSTEM

(71) Applicant: Hitachi High-Tech Corporation, Tokyo (JP)

(72) Inventors: Fumiya Nehashi, Tokyo (JP); Toshiharu Suzuki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/646,821

(22) PCT Filed: Mar. 29, 2019

(86) PCT No.: PCT/JP2019/014292
§ 371 (c)(1),
(2) Date: Mar. 12, 2020

(87) PCT Pub. No.: WO2019/189869
PCT Pub. Date: Oct. 3, 2019

(65) Prior Publication Data
US 2020/0278365 A1    Sep. 3, 2020

(30) Foreign Application Priority Data
Mar. 29, 2018    (JP) .............................. JP2018-063501

(51) Int. Cl.
*G01N 35/10*    (2006.01)
*G01N 35/00*    (2006.01)
(Continued)

(52) U.S. Cl.
CPC ... *G01N 35/1004* (2013.01); *G01N 35/00722* (2013.01); *G01N 35/025* (2013.01);
(Continued)

(58) Field of Classification Search
None
See application file for complete search history.

(56) References Cited

U.S. PATENT DOCUMENTS

| 2013/0130390 A1 | 5/2013 | Dussi et al. |
| 2013/0311243 A1 | 11/2013 | Taki et al. |
| 2018/0224477 A1 | 8/2018 | Noda |

FOREIGN PATENT DOCUMENTS

| CN | 107796949 A | 3/2018 |
| JP | 2008051532 A | 3/2008 |

(Continued)

OTHER PUBLICATIONS

Machine generated English translation of JP-2012018103-Kawa, published Jan. 2012.*

(Continued)

*Primary Examiner* — Kathryn Wright
(74) *Attorney, Agent, or Firm* — Miles & Stockbridge, P.C.

(57) ABSTRACT

Maintenance time for an automated analysis device is reduced by executing a plurality of maintenance items in parallel. An automated analysis system 10 is provided with an automated analysis device 11 and a terminal device 38. The automated analysis system 11 measures a sample. The terminal device 38 includes a display unit 32, an operation unit 32, and a control unit provided in a computer 30. The display unit 32 displays maintenance items for maintaining the automated analysis device 11. The operation unit 31 selects one or more of the maintenance items displayed on the display unit 32. The control unit controls the automated analysis device 11 to execute in parallel all the maintenance items selected by the operation unit 31.

10 Claims, 7 Drawing Sheets

(51) Int. Cl.
*G01N 35/02* (2006.01)
*G01N 35/04* (2006.01)

(52) U.S. Cl.
CPC .............. *G01N 35/1065* (2013.01); *G01N 2035/00356* (2013.01); *G01N 2035/00534* (2013.01); *G01N 2035/00891* (2013.01); *G01N 2035/0443* (2013.01); *G01N 2035/0453* (2013.01)

(56) References Cited

FOREIGN PATENT DOCUMENTS

| | | | |
|---|---|---|---|
| JP | 2010122123 A | | 6/2010 |
| JP | 2012018103 A | * | 1/2012 |
| JP | 2015108641 A | | 6/2015 |
| JP | 2017146264 A | | 8/2017 |
| WO | 2017033597 A1 | | 3/2017 |

OTHER PUBLICATIONS

Machine-generated translation of OA of CN 10776949 (dated Oct. 21, 2020) (Year: 2020).*
Office Action dated Oct. 21, 2020 in corresponding Chinese Application No. 201980004512.6.

* cited by examiner

[FIG. 1]
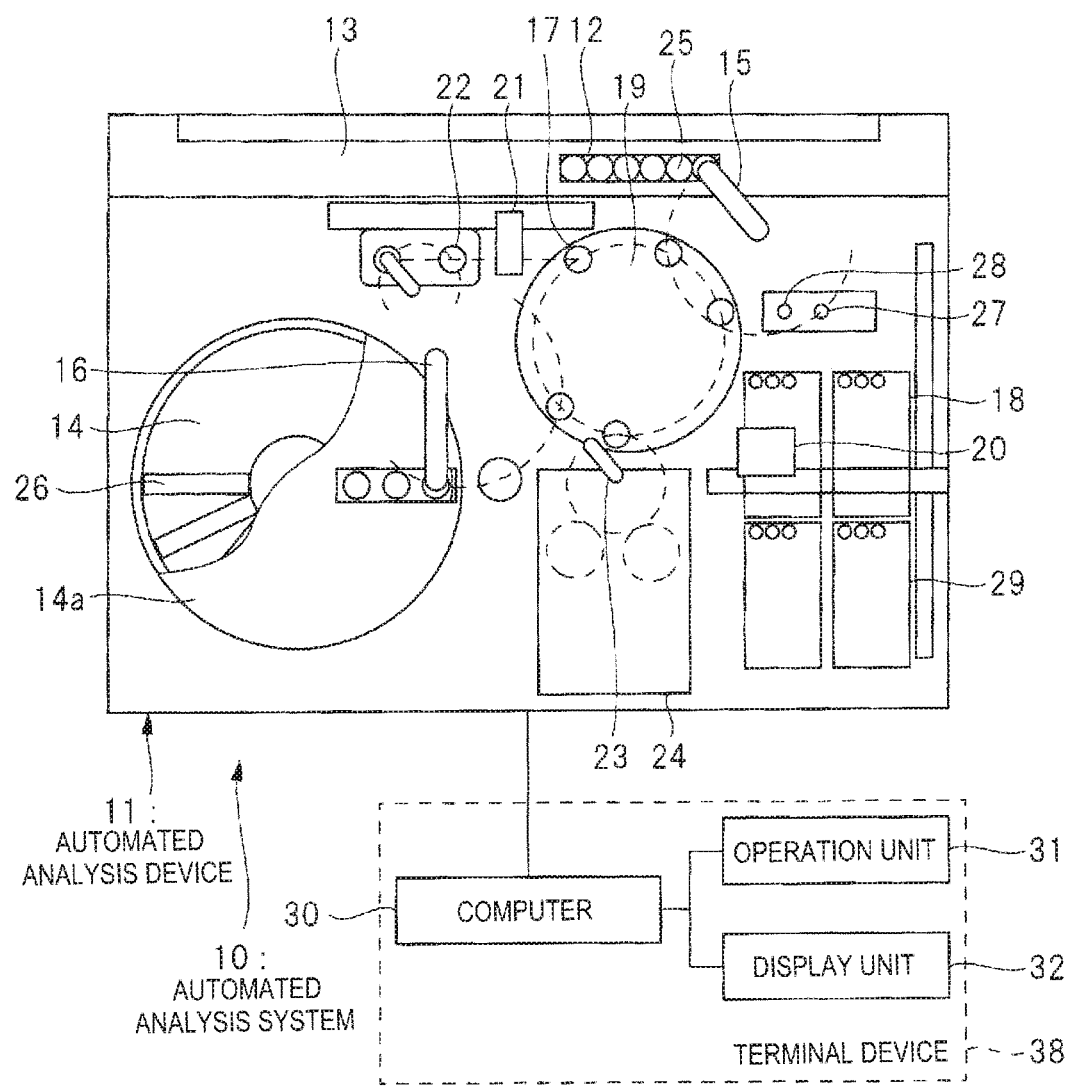

[FIG. 2]
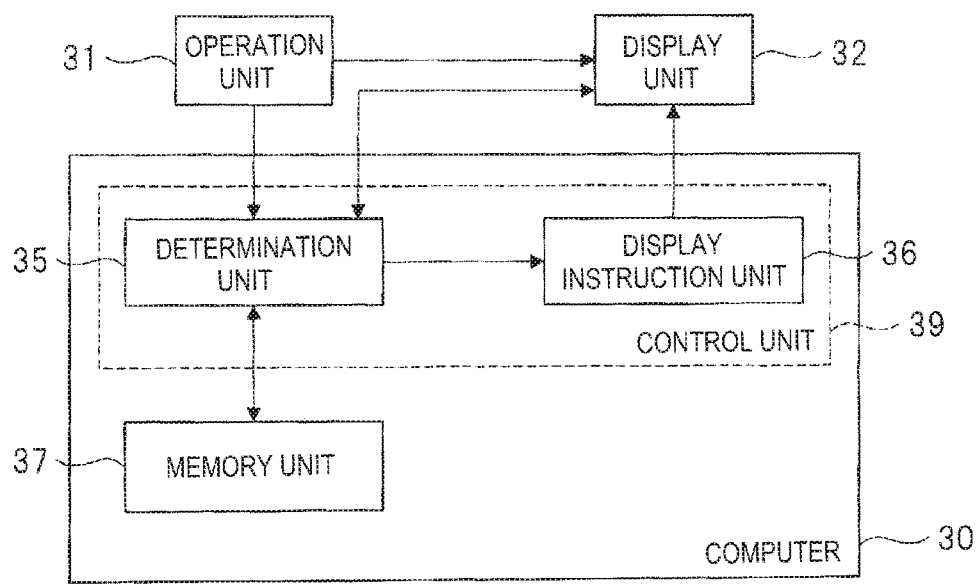

[FIG. 3]
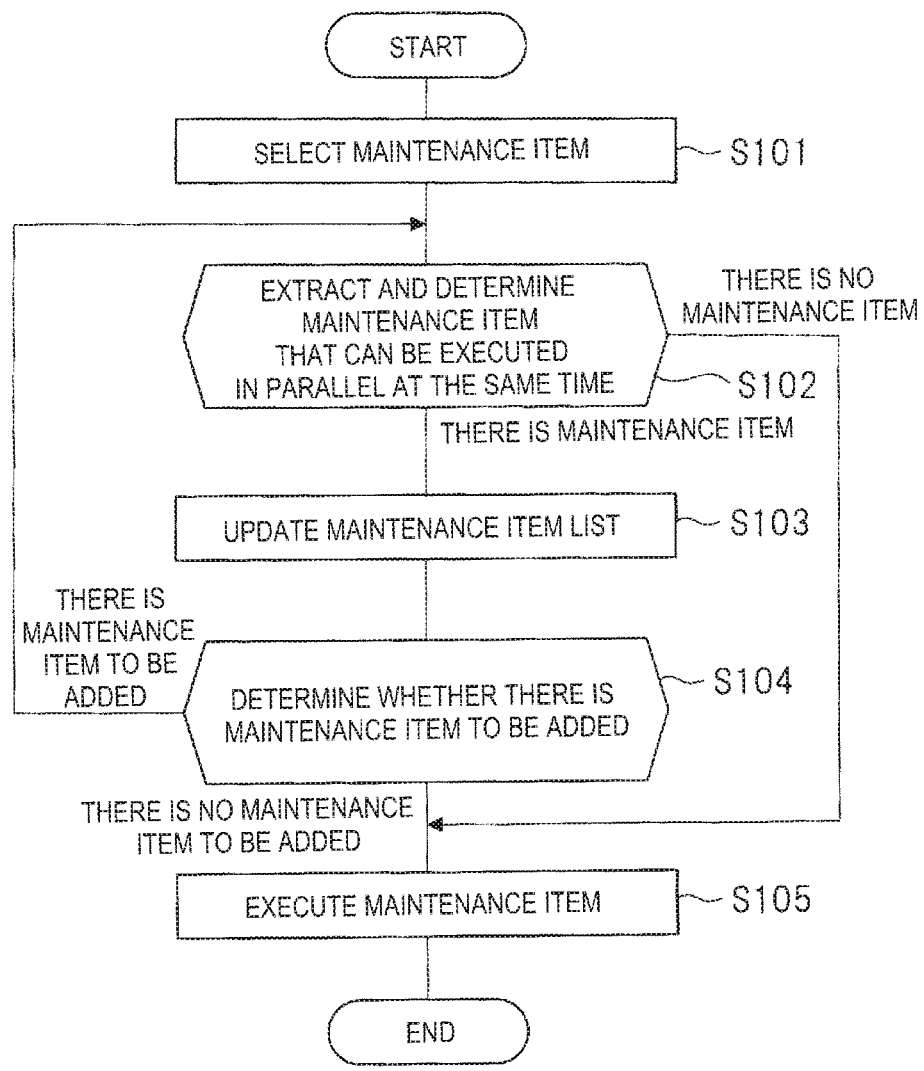

[FIG. 4]
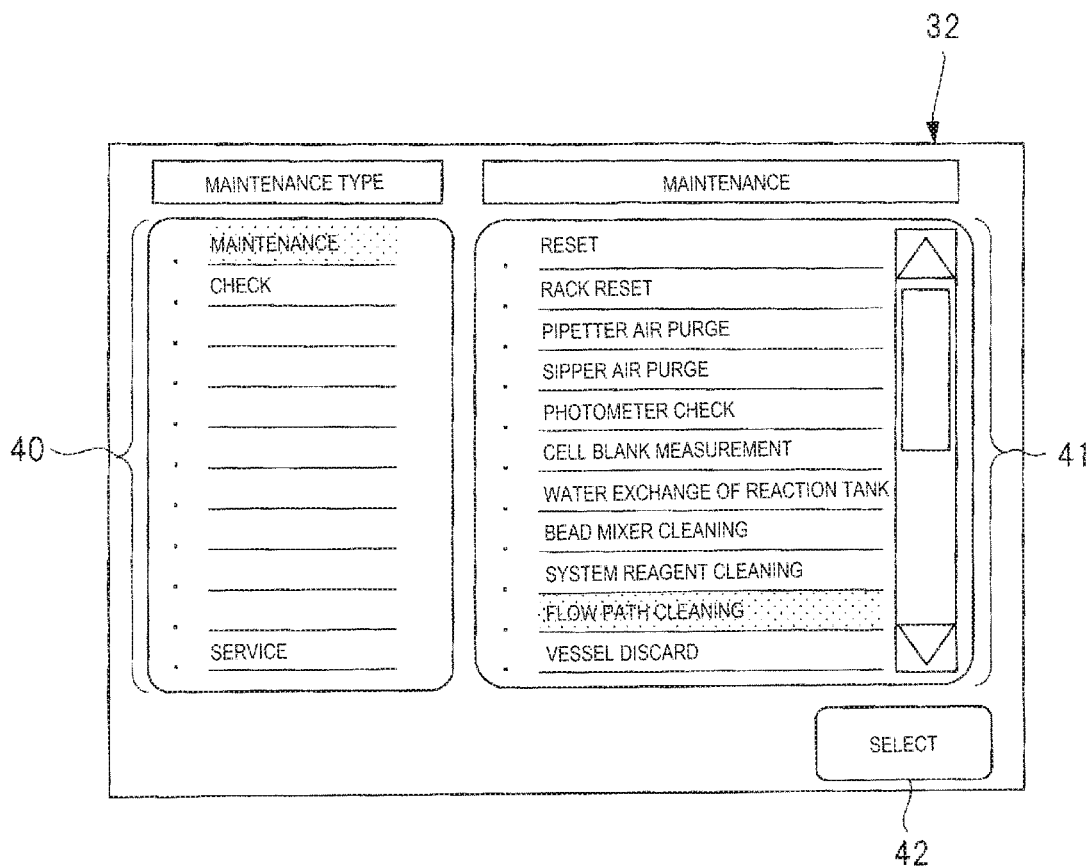

[FIG. 5]

| MAINTENANCE ITEM | PARALLEL PROCESSING MAINTENANCE ITEM |
|---|---|
| FLOW PATH CLEANING | REAGENT PIPETTER CLEANING<br>BEAD MIXER CLEANING<br>PIPETTER AIR PURGE<br>VESSEL DISCARD |
| REAGENT PIPETTER CLEANING | |
| | |
| | |

50

[FIG. 6]
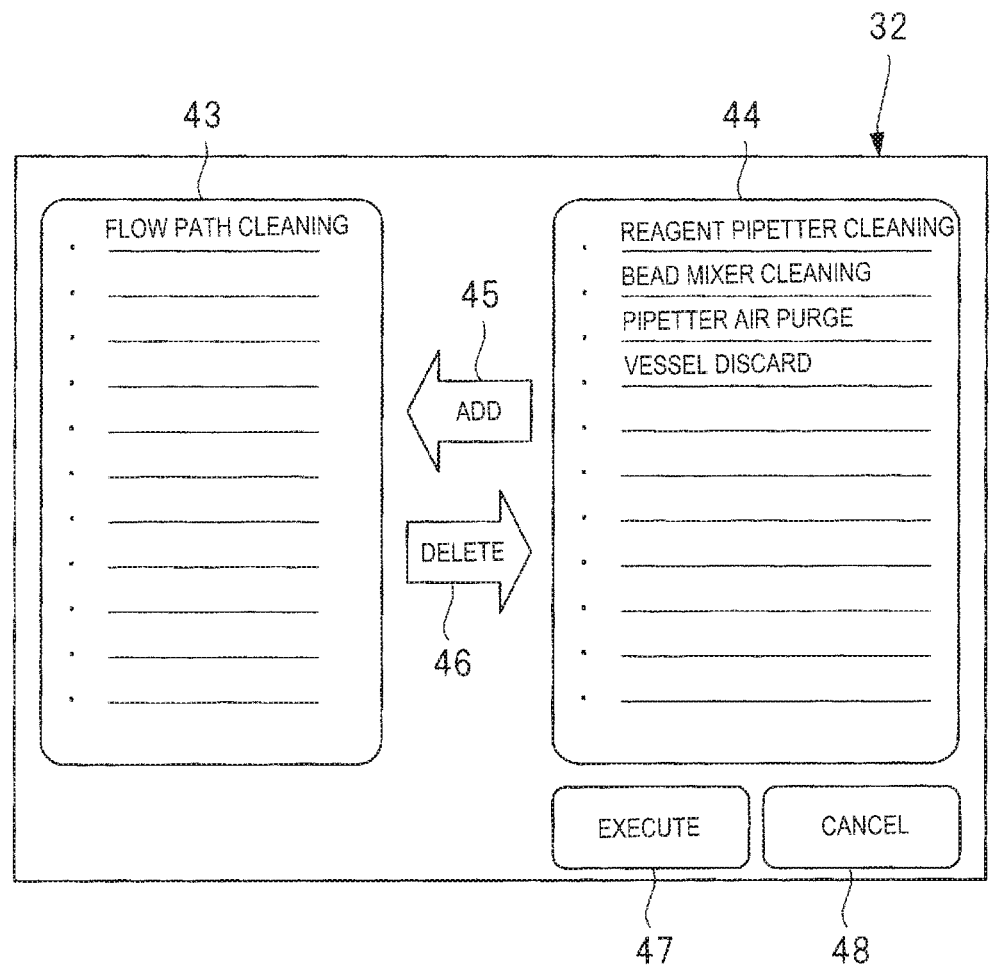

[FIG. 7]
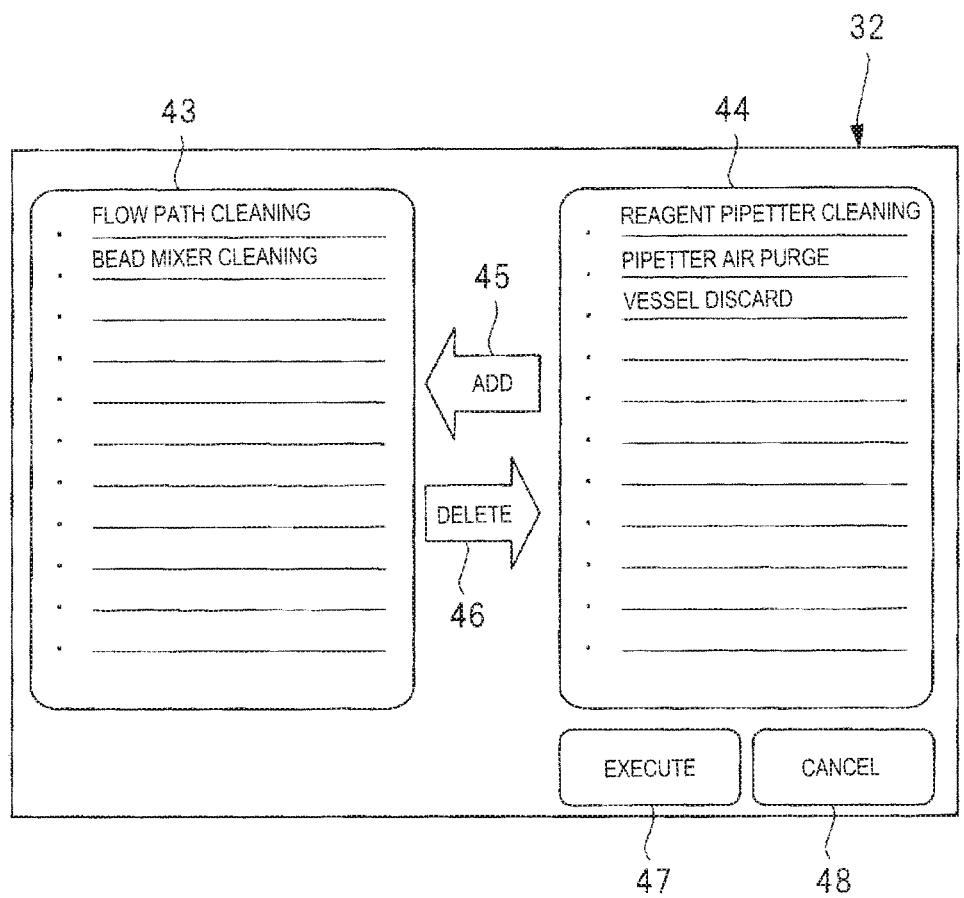

AUTOMATED ANALYSIS SYSTEM

TECHNICAL FIELD

The present invention relates to an automated analysis system, and particularly to a technique effective for shortening maintenance time of an automated analysis device.

BACKGROUND ART

An automated analysis device performs a qualitative and quantitative analysis of a sample component such as blood or urine. In this type of automated analysis device, maintenance is performed for a purpose of maintaining a condition and checking operation of hardware of the automated analysis device.

In recent years, in analysis work of the sample component, routine work such as personnel reduction, an increase in a sample analysis processing amount, and an immediate response to an urgent sample have been overcrowded. Therefore, in a maintenance schedule of the automated analysis device, it is necessary to perform the appropriate maintenance in idle time as a routine work schedule becomes overcrowded.

In the automated analysis device, in order to perform the appropriate maintenance in limited time, a plurality of pieces of maintenance to be performed by a user are selected and executed continuously.

As a maintenance technique for selecting and executing the plurality of pieces of maintenance in this type of automated analysis device, for example, it is known that a maintenance item to be executed is extracted at a time point when an instruction to execute the maintenance is issued, and the extracted maintenance item is rearranged in a recommended execution order according to a preset rule (see, for example, PTL 1).

CITATION LIST

Patent Literature

PTL 1: JP-A-2015-108641

SUMMARY OF INVENTION

Technical Problem

PTL 1 described above discloses that the maintenance item is rearranged in the recommended execution order based on a preset rule that similar maintenance or maintenance of the same part is performed continuously. However, in the technique of PTL 1, a plurality of pieces of maintenance cannot be performed in parallel in the same automated analysis device at the same time.

Therefore, even when there is the plurality of maintenance items that can be executed in parallel at the same time in the automated analysis device, the maintenance is performed in the recommended execution order. In this way, since the plurality of pieces of maintenance is sequentially processed, processing time becomes long and efficiency of the maintenance is reduced.

An object of the invention is to provide a technique capable of shortening maintenance time in an automated analysis device by executing a plurality of maintenance items in parallel.

The above and other objects and novel features of the invention will become apparent from the description of the present specification and the accompanying drawings.

Solution to Problem

Typical ones of the invention disclosed in the present application will be briefly described as follows.

That is, a typical automated analysis system includes an automated analysis device and a terminal device connected to the automated analysis device. The automated analysis device measures a sample. The terminal device includes a display unit, an operation unit, and a control unit.

The display unit displays a maintenance item configured to maintain the automated analysis device. The operation unit selects the maintenance item displayed on the display unit. The control unit controls the automated analysis device so that all maintenance items selected by the operation unit are executed in parallel.

Particularly, the control unit extracts a maintenance item that can be executed in parallel to the maintenance item selected by the operation unit based on a preset maintenance processing table, and causes the display unit to display the extracted maintenance item.

The maintenance processing table includes a maintenance item and a parallel processing maintenance item corresponding to the maintenance item. The parallel processing maintenance item shows the maintenance item that can be executed in parallel to the maintenance item selected by the operation unit.

The control unit extracts a maintenance item shown in the parallel processing maintenance item corresponding to the maintenance item from the maintenance processing table when the maintenance item is selected by the operation unit, and causes the display unit to display the extracted maintenance item as the maintenance item that can be executed in parallel.

Advantageous Effect

In the invention disclosed in the application, effects obtained by the typical ones will be briefly described as follows.

(1) Maintenance time of the automated analysis device can be shortened.

(2) According to (1), analysis efficiency of the automated analysis device can be improved.

BRIEF DESCRIPTION OF DRAWINGS

FIG. 1 is an explanatory diagram showing an example of a configuration in an automated analysis system according to an embodiment.

FIG. 2 is an explanatory diagram showing an example of a configuration of a computer provided in the automated analysis system of FIG. 1.

FIG. 3 is a flowchart showing an example of execution processing of a maintenance function performed by the automated analysis system of FIG. 1.

FIG. 4 is an explanatory diagram showing an example of a maintenance item screen displayed on a display unit provided in the automated analysis system of FIG. 1.

FIG. 5 is an explanatory diagram showing an example of a configuration of a maintenance processing table stored in a memory unit provided in the computer of FIG. 1.

FIG. 6 is an explanatory diagram showing an example of an updated maintenance item screen displayed on the display unit provided in the automated analysis system of FIG. 1.

FIG. 7 is an explanatory diagram showing an example of a maintenance item screen following FIG. 6.

DESCRIPTION OF EMBODIMENTS

In all the drawings for showing the embodiment, the same members are denoted by the same reference numerals in principle, and the repetitive description thereof will be omitted.

<Configuration Example of Automated Analysis System>

FIG. 1 is an explanatory diagram showing an example of a configuration in an automated analysis system 10 according to an embodiment.

As shown in FIG. 1, the automated analysis system 10 includes an automated analysis device 11, a computer 30, an operation unit 31, and a display unit 32. Further, a terminal device 38 is configured with the computer 30, the operation unit 31, and the display unit 32.

The automated analysis device 11 includes a sample rack 12, a transport line 13, a reagent disk 14, a sample dispensing mechanism 15, a reagent dispensing mechanism 16, a reaction vessel 17, a holding unit 18, an incubator disk 19, transport mechanisms 20 and 21, a reaction vessel stirring mechanism 22, a liquid suction nozzle 23, a detection unit 24, and the like.

The sample rack 12 is equipped with a sample vessel 25 that contains a sample to be analyzed. The sample contained in a reagent vessel 26 includes a patient sample which is a biological sample such as blood or urine. The transport line 13 transports the sample rack 12.

The reagent disk 14 is provided with a plurality of reagent vessels 26 that contain a reagent used for sample analysis. The sample dispensing mechanism 15 dispenses the sample contained in the sample vessel 25 transported by the transport line 13 into the reaction vessel 17.

The reagent dispensing mechanism 16 suctions the reagent in the reagent vessel 26 provided in the reagent disk 14 and dispenses the reagent into the reaction vessel 17. The holding unit 18 stores the reaction vessel 17 and a sample dispensing tip.

The incubator disk 19 places the reagent and the reaction vessel 17 into which the sample is dispensed and reacts the reagent and the sample while keeping a temperature constant. A plurality of the reaction vessels 17 can be provided in the incubator disk 19. Further, the incubator disk 19 is rotatable to move each of the reaction vessels 17 provided in a circumferential direction to a predetermined position.

The transport mechanism 20 transports the reaction vessel 17 to the incubator disk 19 or a discard unit 27 and transports the sample dispensing tip to a sample dispensing tip mounting position 28 or the discard unit 27. The discard unit 27 discards the sample dispensing tip and the reaction vessel 17.

The transport mechanism 20 is movable in three directions including an X-axis direction, a Y-axis direction, and a Z-axis direction, and transports the sample dispensing tip and the reaction vessel 17 by moving in a preset range of the holding unit 18, the discard unit 27, the sample dispensing tip mounting position 28, and the incubator disk 19.

The transport mechanism 20 moves above the holding unit 18 and descends to grip an unused reaction vessel 17 and then ascends, and moves above the incubator disk 19 and descends to provide the reaction vessel 17.

Then, the transport mechanism 20 moves above the holding unit 18 and descends to grip an unused sample dispensing tip. Thereafter, the transport mechanism 20 ascends to move above the sample dispensing tip mounting position 28, and then descends to provide the sample dispensing tip.

The holding unit 18 is provided with a plurality of unused reaction vessels 17 and a plurality of sample dispensing tips. Similarly, a spare holding unit 29 is provided with a plurality of unused reaction vessels 17 and a plurality of sample dispensing tips. As soon as the reaction vessel 17 and the sample dispensing tip in the holding unit 18 are exhausted, the reaction vessel 17 and the sample dispensing tip provided in the spare holding unit 29 are used.

The sample dispensing mechanism 15 is rotatable and movable up and down, and rotates a nozzle provided in the sample dispensing mechanism 15 to the sample dispensing chip mounting position 28 and then descends the nozzle. Accordingly, the sample dispensing tip is press-fitted and mounted to a distal end portion of the nozzle.

Herein, the sample dispensing tip is a container that suctions and holds a sample of liquid, and controls a suction amount of the sample such that the sample does not reach the distal end portion of the nozzle in order to prevent pollution, that is, contamination of the nozzle.

The nozzle to which the sample dispensing tip is mounted moves above the sample vessel 25 placed in the sample rack 12 and then descends. Then, the sample held in the sample vessel is suctioned into the sample dispensing tip by a predetermined amount.

The sample dispensing tip that has suctioned the sample moves above the incubator disk 19 by the sample dispensing mechanism 15 and then descends and discharges the sample to the unused reaction vessel 17 held in the incubator disk 19.

When the sample is discharged, the sample dispensing mechanism 15 moves the nozzle above the discard unit 27, and discards the used sample dispensing tip from the discard unit 27.

As described above, the reagent disk 14 is provided with the plurality of reagent vessels 26. A reagent disk cover 14a is provided on the reagent disk 14. An inside of the reagent disk cover 14a is kept at a predetermined temperature.

A part of the reagent disk cover 14a is provided with a reagent disk cover opening. The reagent dispensing mechanism 16 is rotatable and movable up and down, and rotates a nozzle above the opening of the reagent disk cover 14a, and then descends to immerse a distal end portion of the nozzle in the reagent in a predetermined reagent vessel 26 and suction a predetermined amount of reagent.

Then, after the nozzle is descended, the reagent dispensing mechanism 16 rotates above a predetermined position of the incubator disk 19 and discharges the reagent to the reaction vessel 17. The reaction vessel 17 to which the sample and the reagent are discharged is transported to a predetermined position by the rotation of the incubator disk 19 and is transported to the reaction container stirring mechanism 22 by the transport mechanism 20.

The reaction container stirring mechanism 22 stirs and mixes the sample and the reagent in the reaction vessel 17 by rotating the reaction vessel 17. The reaction vessel 17 after the stirring is returned to the predetermined position of the incubator disk 19 by the transport mechanism 20.

The liquid suction nozzle 23 is rotatable and movable up and down. When the sample and the reagent are dispensed and the stirring is completed, liquid in the reaction vessel 17 is suctioned by moving the liquid suction nozzle 23 above the reaction vessel 17 after a predetermined reaction time and descending the liquid suction nozzle 23 on the incubator disk 19.

The liquid suctioned by the liquid suction nozzle 23 is analyzed by the detection unit 24. The reaction vessel 17 from which the liquid has been suctioned moves to a predetermined position by the rotation of the incubator disk 19, moves from the incubator disk 19 to above the discard unit 27 by the transport mechanism. 20, and is discarded from the discard unit 27.

The computer 30 includes, for example, a personal computer and is connected to the automated analysis device 11. The computer 30 controls the automated analysis device 11 based on a sequence program or the like which is a predetermined program for controlling each mechanism of the automated analysis device 11.

The operation unit 31 is, for example, an input unit such as a mouse or a keyboard. The display unit 32 is a graphical user interface (GUI) and displays various pieces of information such as an operation screen and information received from the operation unit 31.

Further, the computer 30 also has a maintenance function of maintaining the automated analysis device 11. The purpose of the maintenance is to maintain a condition and check operation of hardware of the automated analysis device 11.

When the maintenance function is activated, a maintenance item screen is displayed on the display unit 32. The maintenance item screen is an operation screen on which a predetermined operation can be performed by an instruction of the mouse or the like provided in the operation unit 31.

When the maintenance is performed, a user selects a maintenance item to be executed by operating the operation unit 31 while looking at a display content of the maintenance item screen displayed on the display unit 32. An operation result obtained by the operation unit 31 is reflected in the display content of the display unit 32.

<Configuration Example of Computer>

FIG. 2 is an explanatory diagram showing an example of a configuration of the computer 30 provided in the automated analysis system 10 of FIG. 1.

As shown in FIG. 2, the computer 30 includes a determination unit 35, a display instruction unit 36, and a memory unit 37. The determination unit 35 controls each mechanism of the automated analysis device 11 based on the sequence program.

Further, the determination unit 35 controls the maintenance function of maintaining the automated analysis device 11 described above. When the maintenance of the automated analysis device 11 is performed, the determination unit 35 presents maintenance items that can be executed in parallel by the automated analysis device 11 by referring to a maintenance processing table 50 to be described later.

By selecting the maintenance item presented by the user, the determination unit 35 executes at least two pieces of maintenance in parallel. Accordingly, maintenance time of the automated analysis device 11 can be shortened.

The display instruction unit 36 displays various types of information displayed on the display unit 32. Further, a control unit 39 is configured with the determination unit 35 and the display instruction unit 36.

The memory unit 37 includes a nonvolatile memory such as a hard disk drive, a flash memory, and the like, and stores various types of information such as the above-described sequence program, an analysis item performed by the automated analysis device 11, and the maintenance processing table 50.

The sequence program is a predetermined program for controlling each mechanism of the automated analysis device 11. The maintenance processing table 50 is a table in which information such as maintenance items that can be executed in parallel, a priority order of the maintenance items, and the like are stored for each maintenance item selected from the maintenance item screen displayed on the display unit 32.

Further, a program for performing the maintenance function is stored in the memory unit 37. Software of a program format stored in the memory unit 37 is executed by the determination unit 35 or the like.

<Selection and Execution Example of Maintenance Item>

FIG. 3 is a flowchart showing an example of execution processing of maintenance performed by the automated analysis system 10 of FIG. 1.

FIG. 3 shows processing from when the maintenance function of the computer 30 is activated to when a maintenance item set in the maintenance function is started.

First, processing of selecting the maintenance item by the user is performed (step S101). In the processing of step S101, when the maintenance function is activated, a maintenance item screen shown in FIG. 4 to be described later is displayed on the display unit 32.

<Display Example of Maintenance Item Screen>

FIG. 4 is an explanatory diagram showing an example of the maintenance item screen displayed on the display unit 32 provided in the automated analysis system 10 of FIG. 1.

The maintenance item screen displayed on the display unit 32 includes a first display area 40 displayed on a left side, a second display area 41 displayed to a right side of the first display area 40, and a selection button 42 displayed below the second display area 41.

The first display area 40 displays a maintenance type. The second display area 41 displays information corresponding to a selection item displayed in the first display area 40 and a scroll bar. The selection button 42 is a button for determining the item selected in the second display area.

The maintenance type displays a type of maintenance to be performed on an item basis. In the example of FIG. 4, maintenance and check are displayed as the maintenance type.

A maintenance 43 is an item to be selected when the maintenance of the automated analysis device 11 is performed, and a check 44 is an item to be selected when checking operation, a condition, and the like of each mechanism of the automated analysis device 11.

When the maintenance of the automated analysis device 11 is performed, the user selects the maintenance 43 from the maintenance type displayed in the first display area 40 by the operation unit 31. The selection item of the maintenance type selected by the operation unit 31 is displayed and known as being selected. In this case, for example, a display color changes, a background color changes, or a font becomes thicker. In FIG. 4, for example, the maintenance is selected, and the color of the display background of the maintenance is changed.

When the maintenance 43 of the first display area 40 is selected, as shown in FIG. 4, all maintenance items that can be executed by the automated analysis device 11 are displayed in the second display area 41.

When the item of the maintenance 43 is selected, the determination unit 35 acquires all maintenance items that can be executed by the automated analysis device 11 by referring to the maintenance processing table 50 stored in the memory unit 37. The maintenance items acquired by the determination unit 35 are output to the display instruction unit 36.

The display instruction unit 36 displays the maintenance items received from the determination unit 35 in the second display area 41. In the second display area, the maintenance items of the automated analysis device 11 are displayed, for example, in a list form.

Further, the scroll bar displayed to a left side of the maintenance items moves a display area of the maintenance items. Accordingly, maintenance items that do not fit in the second display area 41 can be displayed.

FIG. 4 shows all maintenance items that can be executed by the automated analysis device 11 are displayed in the second area 41, and flow path cleaning is selected as a maintenance item as an example.

The user selects an item for executing maintenance from the maintenance items displayed in the second display area 41 by the operation unit 31. In the second display area 41, the selected item also changes so that the user knows that the item is selected, for example, the display color changes, the background color changes, or the font becomes thicker.

Thereafter, the user selects the selection button 42 with the operation unit 31 to determine the maintenance item selected in the second display area 41. When the maintenance item is determined, additional processing of the maintenance item is performed in FIG. 3.

In the additional processing of the maintenance item, first, it is determined whether there is a maintenance item that can be executed in parallel to the maintenance item determined in the processing of step S101 (step S102).

The determination unit 35 searches for maintenance items that can be executed in parallel to the maintenance item determined in the processing of step S101 by referring to the maintenance processing table 50 stored in the memory unit 37.

Then, when there are maintenance items that can be executed in parallel to the maintenance item determined in the processing of step S101, the determination unit 35 acquires and updates the maintenance items that can be executed in parallel (step S103).

The determination unit 35 outputs the updated maintenance items to the display instruction unit 36. The display instruction unit 36 causes the display unit 32 to display the maintenance items received from the determination unit 35, for example, in a list format.

At this time, instead of simply displaying the maintenance items in a list format, the determination unit 35 may rearrange the maintenance items in descending order of execution frequency based on count information stored in the memory unit 37 and cause the display unit 32 to display the maintenance items. Accordingly, the user can easily find the maintenance item to be selected.

For the execution frequency of the maintenance items, for example, the determination unit 35 counts the execution number of a maintenance item executed each time the maintenance is executed and stores the count information in the memory unit 37. Alternatively, the determination unit 35 may store the count information in the maintenance processing table 50 in association with the maintenance item provided in the maintenance processing table 50 to be described later.

Further, in the processing of step S102, when the determination unit 35 determines that there is no maintenance item that can be executed in parallel to the maintenance item determined in the processing of step S101, the processing of step S105 is performed.

Herein, a configuration of the maintenance processing table 50 will be described.

<Configuration Example of Maintenance Processing Table>

FIG. 5 is an explanatory diagram showing an example of a configuration of the maintenance processing table 50 stored in the memory unit 37 provided in the computer 30 of FIG. 1.

As shown in FIG. 5, the maintenance processing table 50 includes a maintenance item and a parallel processing maintenance item. The maintenance item includes all maintenance items that can be executed by the automated analysis device 11.

The parallel processing maintenance item shows maintenance items that can be executed in parallel to a selected maintenance item when a certain maintenance item is selected, and is associated with each maintenance item.

For example, when the flow path cleaning is selected as a maintenance item, the parallel processing maintenance item of the maintenance processing table 50 associated with the flow path cleaning shows maintenance items that can be executed in parallel to the flow path cleaning.

Specifically, the flow path cleaning is to clean a measurement cell flow path, and is maintenance using the detection unit 24 as a mechanism of the automated analysis device 11. Therefore, maintenance items in the parallel processing maintenance item that use a mechanism that does not interfere with the detection unit 24 used in the flow path cleaning, that is, maintenance such as reagent pipetter cleaning, bead mixer cleaning, pipetter air purge, and vessel discard, can be performed in parallel.

The reagent pipetter cleaning uses the reagent dispensing mechanism 16. The bead mixer cleaning is to clean the reagent disk 14 and uses the reagent disk 14. The pipetter air purge is to remove bubbles of a flow path of the reagent dispensing mechanism 16 and a flow path of the sample dispensing mechanism 15 and uses the reagent dispensing mechanism 16 and the sample dispensing mechanism 15.

The vessel discard is to discard a vessel, which is a sample container, and uses the holding unit 18 that holds the reaction vessel 17 and the sample dispensing tip. All these maintenance items can perform maintenance in parallel without interfering with the detection unit 24 used in the flow path cleaning.

Therefore, for example, when the flow path cleaning is selected as the maintenance item, the maintenance items such as the reagent pipetter cleaning, the bead mixer cleaning, the pipetter air purge, and the vessel discard can be processed in parallel.

Alternatively, the maintenance processing table 50 may include the maintenance item and an extraction element that is preset for each maintenance item.

The extraction element includes, for example, a first element and a second element. The first element is a list in which maintenance items that do not interfere with each mechanism in the automated analysis device 11 when the maintenance is performed are extracted.

The second element is an element in which, in a maintenance item that uses a limited resource such as pure water and electric power, an amount of use of the resource used for the maintenance is shown and maintenance items that do not lead to a resource shortage when the maintenance is performed are extracted.

As described above, the second element focuses on a resource such as pure water or electric power consumed when the maintenance of the automated analysis device 11 is performed, instead of an interference of the mechanism in the automated analysis device 11. The extraction of the maintenance items by the second element is performed, for example, together with the extraction of the maintenance items by the first element.

For example, it is assumed that water exchange of a reaction tank is selected as the maintenance item. The water exchange of the reaction tank is maintenance for exchanging water in the reaction tank to hold liquid for keeping the reaction vessel 17 at a constant temperature. In the selected water exchange of the reaction tank, pure water is used as the resource.

Therefore, it is possible to manage an amount of use of pure water in blank measurement, reaction tank cleaning, or probe cleaning, which are other maintenance items using pure water by referring to the second element of the maintenance processing table which is not shown.

First, when a maintenance item that uses pure water is selected, the determination unit 35 acquires an amount of pure water used for the maintenance item selected from the second element. Then, a difference between a remaining amount of a tank that stores pure water and the acquired amount of use of pure water is calculated.

Next, the determination unit 35 extracts a maintenance item whose amount of use of pure water is smaller than an amount of the calculated difference by referring to the second element. If the amount of the calculated difference is greater than an amount of pure water used for the maintenance item selected later, it can be determined that these two maintenance items can be executed in parallel.

Therefore, since the maintenance item extracted by the determination unit 35 is a maintenance item that can be executed in parallel to a previously selected maintenance item, the determination unit 35 outputs the extracted maintenance item to the display instruction unit 36. The display unit 32 displays a list of maintenance items that can be executed in parallel to the previously selected maintenance item.

For example, when the water exchange of the reaction tank is previously selected as the maintenance item, the determination unit 35 calculates a water amount obtained by subtracting a water amount required for the water exchange of the reaction tank from a pure water amount stored in the storage tank. Then, the determination unit 35 acquires, from the second element, the maintenance item that can perform the maintenance at a water amount smaller than the calculated water amount and causes the display unit 32 to display the acquired maintenance item.

For example, if the probe cleaning is the maintenance item that can perform the maintenance at the water amount smaller than the calculated water amount, the probe cleaning is extracted as the maintenance item that can be executed in parallel. In this case, even if the water exchange of the reaction tank and the probe cleaning are executed in parallel, pure water stored in the tank is not exhausted.

Accordingly, it is possible to easily select a plurality of maintenance items that can be processed in parallel based on the amount of use of resources such as pure water and electric power. In this way, since it is possible to determine whether parallel processing of maintenance in the plurality of maintenance items using the resource can be performed, the user can select the maintenance item without worrying about the resource or the like. Accordingly, convenience for the user can be improved.

The determination by the second element may be performed not only in maintenance items executed in parallel, but also when the plurality of maintenance items are sequentially executed. This is effective when, for example, two pieces of maintenance using the resource are sequentially performed. Also, it is possible to prevent the resource such as pure water from being exhausted during the maintenance to be performed secondly.

In addition, in the case of electric power, maintenance items are extracted in which a sum of an electric power amount required for the maintenance items to be executed in parallel is smaller than a preset electric power value. Accordingly, when the plurality of maintenance items are executed, it is possible to prevent a rated power of the automated analysis device 11 from being exceeded, and to enhance reliability of the automated analysis device 11.

Thereafter, in FIG. 3, the determination unit 35 determines whether there is a maintenance item to be added and executed to the determined maintenance item (step S104). When there is the maintenance item to be added, the processing returns to step S102. The processing of steps S102 to S104 is repeatedly performed until it is determined that there is no maintenance item to be newly added.

When there is no maintenance item to be added and executed in the processing of step S104, or when it is determined that there is no maintenance item that can be executed in parallel to the maintenance item determined in the processing of step S102, the maintenance item determined in the processing of step S101 or the processing of steps S102 to S104 is executed (step S105).

FIG. 6 is an explanatory diagram showing an example of an updated maintenance item screen displayed on the display unit 32 provided in the automated analysis system 10 of FIG. 1.

FIG. 6 shows a display example when a new maintenance item that can be executed in parallel to the maintenance item determined in the processing of step S103 in FIG. 3 is displayed on the display instruction unit 36.

In this case, as shown in FIG. 6, the maintenance item screen displayed on the display unit 32 includes a third display area 43, a fourth display area 44, an addition button 45, a deletion button 46, an execution button 47, and a cancel button 48.

The third display area 43 is displayed on a left side of the maintenance item screen in FIG. 6, and the fourth display area 44 is displayed to a right side of the third display area 43. Between the third display area and the fourth display area, the addition button 45 and the deletion button 46 are respectively displayed from above to below. Below the fourth display area 44, the execution button 47 and the cancel button 48 are displayed from left to right, respectively.

In the third display area 43, a determined maintenance item is displayed. In the fourth display area 44, maintenance items that can be executed in parallel to the maintenance item displayed in the third display area 43 are displayed.

When there is a newly added maintenance item, the user selects an item for performing the maintenance from the maintenance items displayed in the fourth display area 44 by the operation unit 31. Even in this case, the selected maintenance item is displayed in a manner such that, for example, a display color changes, a background color changes, or a font becomes thicker.

After the maintenance item is selected, by pressing the addition button 45 with the operation unit 31, the selected maintenance item is determined and is displayed in the third display area 43.

When a maintenance item displayed in the third display area 43 is to be deleted, the maintenance item displayed in the third display area 43 is selected by the operation unit 31 and then deleted by pressing the deletion button 46. Further, when the execution button 47 is pressed by the operation unit 31, the selected maintenance item is executed.

FIG. 7 is an explanatory diagram showing an example of a maintenance item screen following FIG. 6.

FIG. 7 shows a display example of a new maintenance item that can be executed in parallel and is updated in the processing of step S103 in FIG. 3 after, for example, the maintenance item of bead mixer cleaning is selected from the fourth display area 44 shown in FIG. 6.

In this case, similar to FIG. 6, the maintenance item screen displayed on the display unit 32 includes the third display area 43, the fourth display area 44, the addition button 45, the deletion button 46, the execution button 47, and the cancel button 48.

In the third display area 43, the determined maintenance items are displayed. In the fourth display area 44, maintenance items that can be executed in parallel to the maintenance item displayed in the third display area 43 are displayed.

When the execution button 47 is pressed via the operation unit 31, the determination unit 35 performs control such that maintenance items displayed in the third display area 43, that is, the selected maintenance items are executed in parallel.

Accordingly, since the plurality pieces of maintenance can be performed in parallel, it is possible to shorten the time required for the maintenance of the automated analysis device 11.

Further, since the maintenance items that can be processed in parallel are displayed on the display unit 32 and only selected by the operation unit 31, burden on the user can be reduced and convenience can be improved.

In the flowchart of FIG. 3, the user selects the maintenance item with the operation unit 31 in the processing of step S101, whereas the first maintenance item may be a preset maintenance item instead of being selected by the user.

In this case, maintenance items to be processed in parallel are the preset maintenance item and the maintenance item selected in the processing of steps S102 to S104. The preset maintenance item includes, for example, the maintenance item such as flow path cleaning.

While the invention made by the inventor has been described in detail based on the embodiment, the invention is not limited to the above-described embodiment and various modifications can be made without departing from the scope of the invention.

REFERENCE SIGN LIST

10 automated analysis system
11 automated analysis device
12 sample rack
13 transport line
14 reagent disk
14*a* reagent disk cover
15 sample dispensing mechanism
16 reagent dispensing mechanism
17 reaction vessel
18 holding unit
19 incubator disk
20 transport mechanism
22 reaction vessel stirring mechanism
23 liquid suction nozzle
24 detection unit
25 sample vessel
26 reagent vessel
27 discard unit
28 sample dispensing tip mounting position
29 spare holding unit
30 computer
31 operation unit
32 display unit
35 determination unit
36 display instruction unit
37 memory unit
38 terminal device

The invention claimed is:

1. An automated analysis system comprising:
    an automated sample analyzer comprising a plurality of reaction vessels and being configured to perform analysis of a plurality of samples by stirring a reagent mixed with one of said plurality of samples within a corresponding one of said reaction vessels; and
    a terminal device connected to the automated sample analyzer and being configured to control said automated sample analyzer, wherein
    the terminal device includes
    a display unit configured to display a maintenance item of the automated analysis device;
    a memory; and
    a computer configured to select the maintenance item displayed on the display and to control the automated sample analyzer so that all selected maintenance items are executed in parallel by the automated sample analyzer based on a preset maintenance processing table stored in the memory,
    wherein the computer is further configured to extract a maintenance item that can be executed in parallel to a selected maintenance item based on the preset maintenance processing table, and to cause the display unit to display the extracted maintenance item.

2. The automated analysis system according to claim 1, wherein
    the preset maintenance processing table includes a maintenance item and a parallel processing maintenance item corresponding to the maintenance item,
    the parallel processing maintenance item shows a maintenance item that can be executed in parallel to the selected maintenance item, and
    the computer extracts a maintenance item shown in the parallel processing maintenance item corresponding to the maintenance item from the preset maintenance processing table when the maintenance item is selected, and causes the display unit to display the extracted maintenance item as the maintenance item that can be executed in parallel.

3. The automated analysis system according to claim 1, wherein
    the preset maintenance processing table is a list in which a maintenance item that does not interfere with maintenance operation of the automated analysis device is extracted for each selected maintenance item, and
    the computer extracts, from the preset maintenance processing table, a maintenance item that does not interfere with operation of a portion of the automated analysis device used in executing the selected maintenance item, and causes the display unit to display the extracted maintenance item as the maintenance item that can be executed in parallel.

4. The automated analysis system according to claim 3, wherein
    the preset maintenance processing table includes a reagent pipetter cleaning maintenance item, a bead mixer cleaning maintenance item, a pipetter air purge maintenance item, and a vessel discard maintenance item, which are indicated as maintenance items that do not interfere with a portion automated sample analyzer used in flow path cleaning which is also a maintenance item, and the computer causes the display unit to display the reagent pipetter cleaning, the bead mixer cleaning, the pipetter air purge, and the vessel discard extracted from the preset maintenance processing table when a maintenance item of the flow path cleaning is selected as the maintenance item that can be executed in parallel.

5. The automated analysis system according to claim 3, wherein the preset maintenance processing table is a list showing a maintenance item using a resource and an amount of use of resource in the maintenance item, and the computer calculates a sum of a value of the resource consumed by the maintenance item selected from the preset maintenance processing table when the maintenance item is selected and a value of the resource consumed by the maintenance item to be executed in parallel to the maintenance item, extracts a maintenance item whose calculated sum is smaller than a preset resource threshold, and causes the display unit to display the extracted maintenance item as the maintenance item that can be executed in parallel.

6. The automated analysis system according to claim 5, wherein the resource in the preset maintenance processing table is pure water, and the computer calculates a sum of a consumption amount of the pure water consumed in the maintenance item selected and a consumption amount of the pure water consumed by each maintenance item to be executed in parallel, extracts, a maintenance item whose calculated sum is smaller than an amount of the pure water stored in a storage tank provided in the automated analysis device as the maintenance item that can be executed in parallel, and causes the display unit to display the maintenance item.

7. An automated analysis system comprising:

an automated sample analyzer comprising a plurality of reaction vessels and being configured to perform analysis of a plurality of samples by stirring a reagent mixed with one of said plurality of samples within a corresponding one of said reaction vessels; and a terminal device connected to the automated sample analyzer and being configured to control said automated sample analyzer, wherein the terminal device includes a display unit configured to display a maintenance item of the automated analysis device;

a memory; and a computer configured to select the maintenance item displayed on the display and to control the automated analysis device so that a preset maintenance item and all selected maintenance items are executed in parallel by the automated sample analyzer based on a preset maintenance processing table stored in the memory, wherein the computer is further configured to extract a maintenance item that can be executed in parallel to the maintenance item selected based on the preset maintenance processing table, and to cause the display unit to display the extracted maintenance item.

8. The automated analysis system according to claim 7, wherein the preset maintenance item is a flow path cleaning maintenance item that causes the computer to execute instructions which clean a measurement cell flow path in the automated sample analyzer.

9. The automated analysis system according to claim 7, wherein the preset maintenance processing table includes a maintenance item and a parallel processing maintenance item corresponding to the maintenance item, the parallel processing maintenance item shows a maintenance item that can be executed in parallel to the selected maintenance item, and the computer extracts a maintenance item shown in the parallel processing maintenance item corresponding to the maintenance item from the preset maintenance processing table when the maintenance item is selected, and causes the display unit to display the extracted maintenance item as the maintenance item that can be executed in parallel.

10. The automated analysis system according to claim 7, wherein the preset maintenance processing table is a list in which a maintenance item that does not interfere with maintenance operation of the automated analysis device is extracted for each of the selected maintenance items, and the computer extracts, from the preset maintenance processing table, a maintenance item that does not interfere with operation of a portion of the automated analysis device used in executing the selected maintenance items when the maintenance item is selected, and causes the display unit to display the extracted maintenance item as the maintenance item that can be executed in parallel.

* * * * *